United States Patent [19]

Malino

[11] Patent Number: 5,799,423
[45] Date of Patent: Sep. 1, 1998

[54] MAGNETIC CALENDAR

[75] Inventor: Mary Slicer Malino, 48 W. Ridgeway Dr., Centerville, Ohio 45459

[73] Assignee: Mary Slicer Malino, Centerville, Ohio

[21] Appl. No.: 674,657

[22] Filed: Jul. 2, 1996

Related U.S. Application Data

[63] Continuation of Ser. No. 332,098, Oct. 31, 1994, abandoned.
[51] Int. Cl.$^6$ .................................................. G09D 3/00
[52] U.S. Cl. ........................... 40/107; 40/600; 40/621; 283/2
[58] Field of Search ........................... 40/107, 110, 119, 40/600, 621; 283/2, 4

[56] References Cited

U.S. PATENT DOCUMENTS

| | | | |
|---|---|---|---|
| 432,838 | 7/1890 | Robinson | 283/2 |
| 3,093,919 | 6/1963 | Holtz | 40/621 |
| 3,975,848 | 8/1976 | Schmid | 40/110 |
| 4,055,009 | 10/1977 | Johanns | 40/107 |
| 4,176,478 | 12/1979 | Brewer | 40/621 X |
| 4,793,634 | 12/1988 | Alloggiamento | 40/107 X |
| 4,852,282 | 8/1989 | Selman | . |
| 4,905,388 | 3/1990 | Sinkow | . |
| 5,090,733 | 2/1992 | Bussiere | 40/107 X |

FOREIGN PATENT DOCUMENTS 2037674  6/1992  Canada ................................. 40/621

*Primary Examiner*—Brian K. Green
*Attorney, Agent, or Firm*—Randall S. Wayland

[57] ABSTRACT

A magnetic calendar (20), which may be of the perpetual type, includes a non-ferromagnetic body portion (22) which is preferably rectangular and preferably substantially planar, having a front surface (24) and back surface (26) for abutting a metal surface (38). The front surface (24) of the body portion (22) is divided into a plurality of segments (28) forming a grid-like section (30). The segments (28) may display artwork (58) such as a small pictorial (66), a portion of a large pictorial (64), or a phrase (60). The magnetic pieces (32) adhere to the front surface (24) of the non-ferromagnetic body portion (22) and may include a feature (33) such as indicia (36), an occasion (35), or a holiday (37) affixed thereon. The magnetic pieces (32) may cover at least a portion of the artwork (58). The magnetic attractive force which adheres each magnetic piece (32) to the front surface (24) of the magnetic calendar (20) is formed between the magnetic strip (44) contained in each magnetic piece (32) and the metal surface (38) of the item to be attached to. The magnetic force acts through the body portion (22), which is preferably made of laminated construction and adheres the magnetic pieces (32) to the non-ferromagnetic body portion (22).

7 Claims, 5 Drawing Sheets

MAGNETIC CALENDAR

This is a continuation of application Ser. No. 08/332,098 field on Oct. 31, 1994, now abandoned.

FIELD OF THE INVENTION

The invention relates to the area of calendars for displaying days of the month and the like. In particular, the calendar includes magnetic pieces.

BACKGROUND OF THE INVENTION

Typical calendars are constructed of paper and hang on the wall or are placed on a desk. In essence, they are the type that once used, they are thrown away. To surmount this problem, calendars were developed for keeping track of the days of the month in a perpetual fashion. In other words, they can be used for multiple months and years. One such calendar is described in U.S. Pat. No. 4,176,478 to Brewer which is hereby incorporated by reference herein. The Brewer calendar has detachable magnetic components, each of which are attracted to a pair of magnetic tacks which are secured to a board structure. The detachable components can be arranged adjacent the tacks to form a perpetual calendar. Although, the Brewer device was adequate for its intended purpose, its manufacture is complex.

U.S. Pat. No. 4,852,282 to Selman describes a magnetic calendar frame. The Selman device includes a calendar frame having a calendar cover which is transparent. A writing surface is formed by the transparent cover which may be written upon by erasable ink. Calendar sheets are inserted behind the cover for display of different months. Further, the Selman calendar includes magnetic strips along the edges for attaching the calendar to a refrigerator door. Again, although this calendar allows for change-out of the sheets, it is not perpetual. One must constantly keep buying replacement sheets. Furthermore, its manufacture is also complex.

U.S. Pat. No. 4,905,388 to Sinkow describes a calendar and organizer for keeping track of pills and medicines to be taken. In particular, the Sinkow calendar allows the user to reuse the calendar by providing a plurality of adhesive stickers for each successive year. However, once the adhesive stickers are adhered in place, it is difficult to move them. Therefore a mistake in placement may be irreversible.

U.S. Pat. No. 5,090,733 to Bussiere describes a motivational printed product where a sticker is applied each day into one of the rectangles. Each sticker includes a motivational thought which may be applied to the substrate. The Bussiere device is not intended for keeping track of the days of the month, is not perpetual, and suffers from the same problem of irreversible placement of the Sinkow calendar. It should be noted, that none of these calendars provide an easily modified calendar which may be perpetual and where the pieces may be easily rearranged if misplaced and is easily manufactured in mass quantities.

SUMMARY OF THE INVENTION

In light of the benefits and inadequacies of the prior art the present invention is a magnetic calendar adapted to be attached to a metal surface or object which is preferably planar whereby the magnetic pieces are adhered to the non-ferromagnetic body portion of the calendar by the magnetic attraction force acting through the non-ferromagnetic body portion and to the magnetic surface or object.

In another aspect, the calendar may be perpetual in that the magnetic pieces may be rearranged as to be used for multiple months and any years. Further, in another aspect, artwork is displayed within the grid-like section of the calendar and may include a pictorials such as objects, phrases, colors, letters and the like which are useful for aiding and enabling learning in children. In another aspect, the body portion is constructed of a laminated sheet or cardboard for ease of manufacture and simplicity. In yet another aspect, the magnetic pieces are constructed of strip magnets with month of the day, an occasion or a holiday affixed thereto. Other aspects will become apparent upon reviewing the accompanying specification, appended claims and drawings.

It is an advantage of the present calendar that the magnetic pieces may be easily rearranged to display calendars of different months of the year and of different years and easily rearranged due to misplacement.

It is a further advantage that the calendar may be manufactured in production quantities at a low cost and includes only a small number of components.

Additional inventive features of the novel calendar will become apparent after viewing the attached drawings and reading the accompanying detailed description.

BRIEF DESCRIPTION OF THE DRAWINGS

The present invention is described with reference to the detailed description taken in connection with the accompanying drawings, in which.

DETAILED DESCRIPTION OF THE INVENTION

Figure 1:
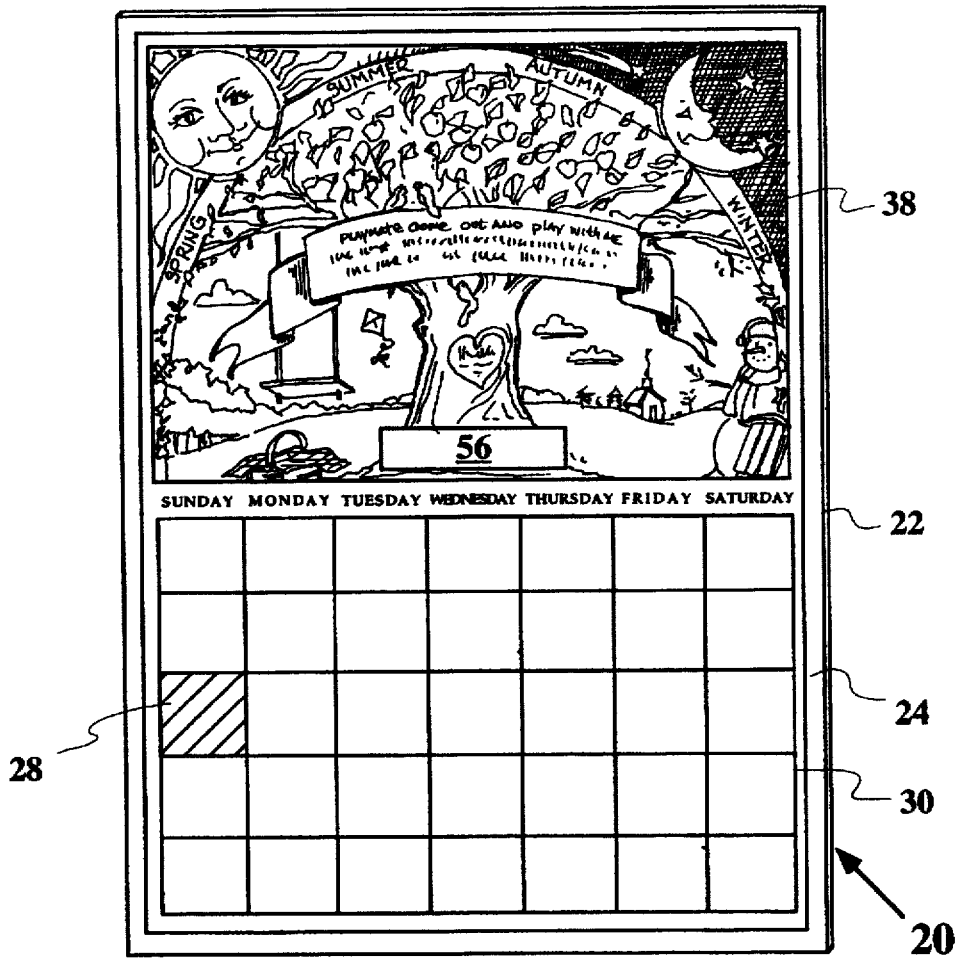
FIG. 1 is a frontal view of the present invention magnetic calendar without the magnetic pieces attached for clarity.

In the following, the invention will be described in detail with respect to the preferred embodiments described herein and the attached illustrations, and drawings. Referring now to FIG. 1, is shown a frontal view of one embodiment of the present invention magnetic calendar 20. The magnetic calendar 20 is to be used adjacent to or abutting a metal surface which is preferably planar. The magnetic calendar 20 includes a non-ferromagnetic body portion 22, which is preferably constructed of a paper sheet, such as color copy, which is laminated on both sides with transparent laminae and is preferably rectangular in shape. The total thickness of the body portion is about 0.035 inch. Alternatively, the body portion 22 may be constructed of cardboard or heavy paper stock and printed thereon. The cardboard may also include a clear coating on the front surface thereof.

Figures 9, 10:
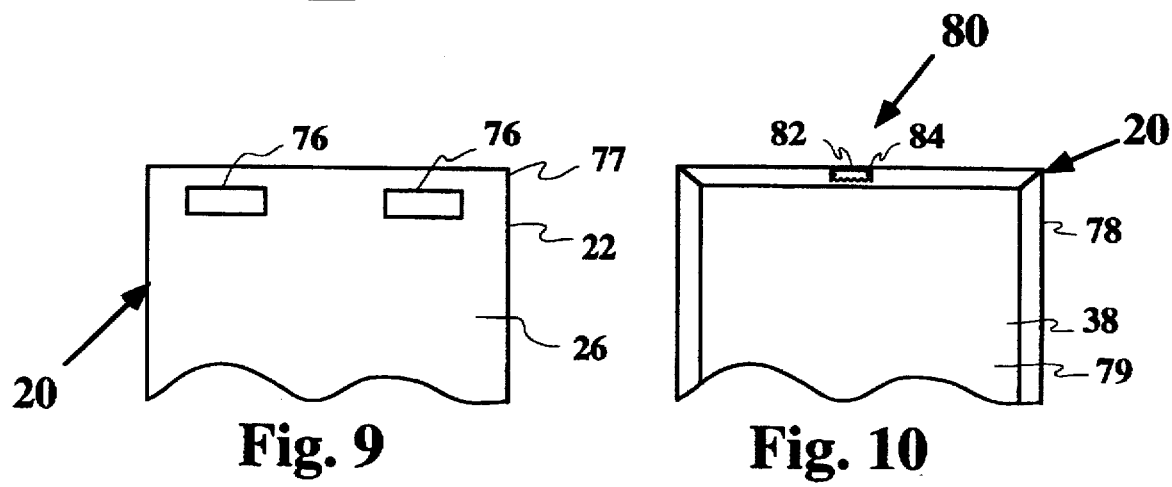
FIG. 9 is a rear view of the back surface illustrating magnetic strips as the means for abutting or attaching to the metal surface.
FIG. 10 is a rear view of the back portion of the hanging-type magnetic calendar.

The body portion 22 is preferably planar and has a front surface 24 and a back surface 26 (FIG. 9). The front surface 24 of the body portion 22 is subdivided into a plurality of segments 28 (shown as hatched for clarity) which form a grid-like section 30. The segments 28 are preferably square or rectangular in shape. Preferably there are thirty five (35) segments 28 contained within the grid-like section 30. Also shown on the front surface 24 of the magnetic calendar 20 is picture 38 and days of the week 31. Picture 38 may be artistic illustration, a photograph or the like. The magnetic calendar 20 may also include a month display segment 56.

Figure 2:
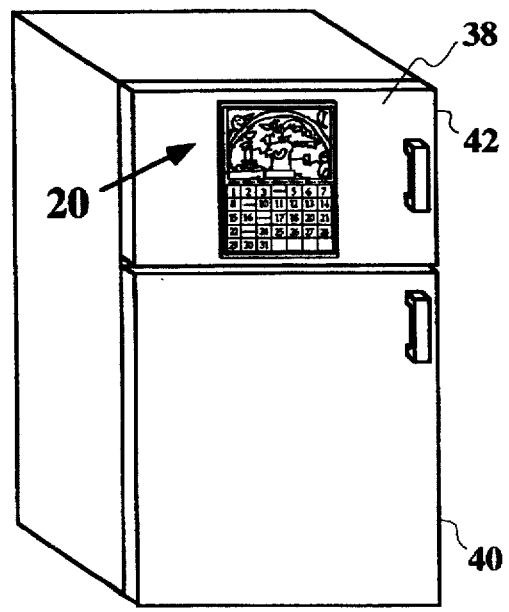
FIG. 2 is an isometric view of a refrigerator with the magnetic calendar adhered to the refrigerator door.
Figure 3:
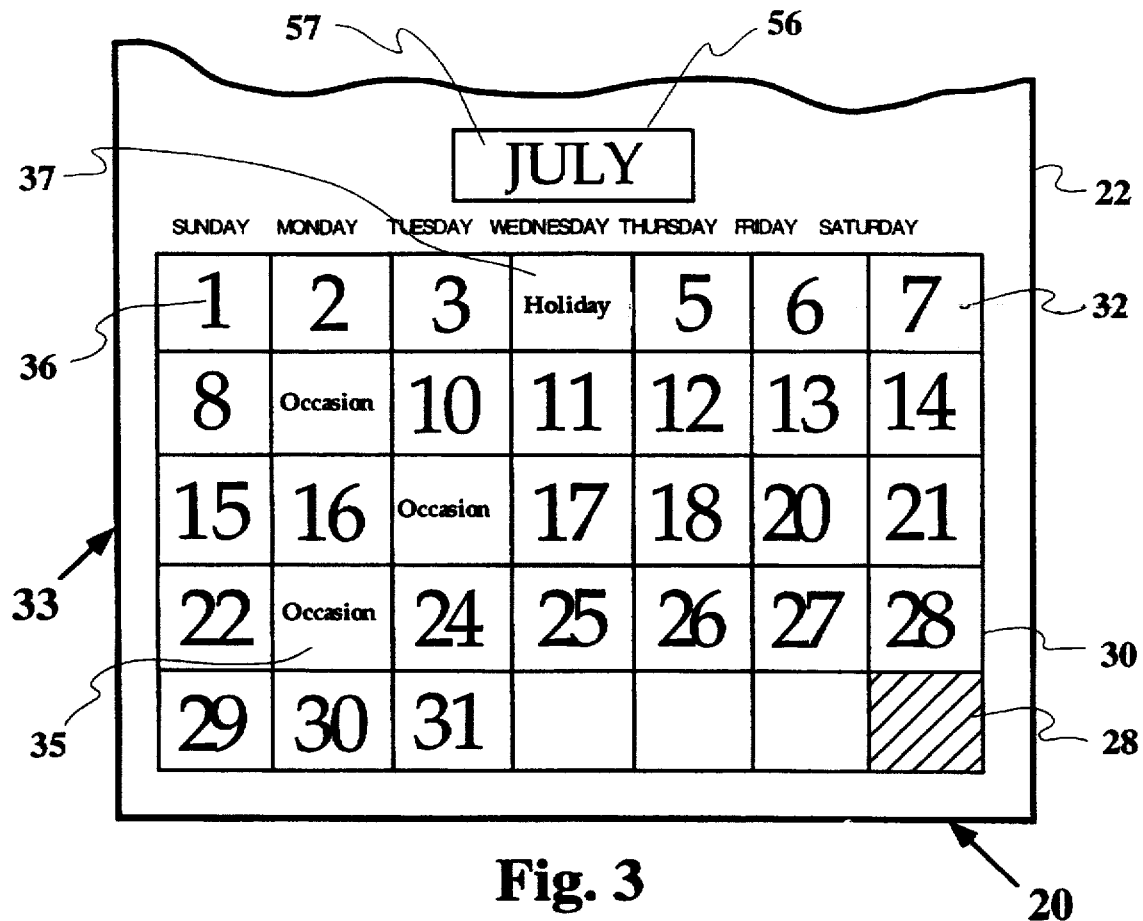
FIG. 3 is a partial frontal view of the grid section of the magnetic calendar with the magnetic pieces adhered thereto as a result of a magnetic force acting through the body portion of the magnetic calendar.

As shown in FIG. 2, the calendar 20 is ideal for display on the metal surface 38 of a refrigerator door 42 on a refrigerator 40. FIG. 3 illustrates the grid-like portion 30 of the calendar 20 having a plurality of magnetic pieces 32 attached or adhered to the front surface 24 of the body portion 22 adjacent and substantially aligned with each of the plurality of segments 28. Each magnetic piece 32 has a feature 33 affixed thereto on at least one side, such as indicia 36 indicating one of a day of the month, an occasion 35 such as a birthday, fathers day, mothers day, vacation, end of school, or the like, or a holiday 37, such as the fourth of July, Christmas, Martin Luther King Day, Hanukkah, or the like. The magnetic piece 32 produces a magnetic field such that when the magnetic piece is placed adjacent one of the segments 28, the magnetic field of the magnetic piece 32 causes a magnetic attractive force directed through said non-ferromagnetic body portion 22 which is directed to said metal surface 38. This magnetic force adheres the magnetic piece 32 to the front surface 24 of the non-ferromagnetic body portion 22 of the magnetic calendar 20.

The magnetic calendar 20 is preferably perpetual in that said magnetic pieces 32 may be arranged in such a way that the magnetic calendar 20 may be used for multiple months and years. The magnetic calendar 20 may include a month display segment 56 which has an associated month piece 57 affixed thereto for indicating the month of the year. The days of the month and the month can be rearranged such that any month of any year may e displayed, thus the magnetic calendar 20 may be perpetual.

Figure 4A:
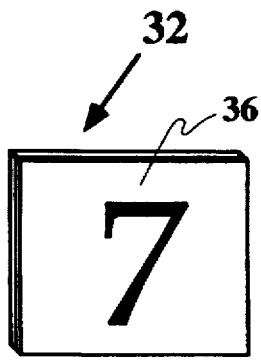
FIG. 4A is includes an isometric view of one of the magnetic pieces having a feature, such as an indicia, affixed thereon.
Figure 4B:
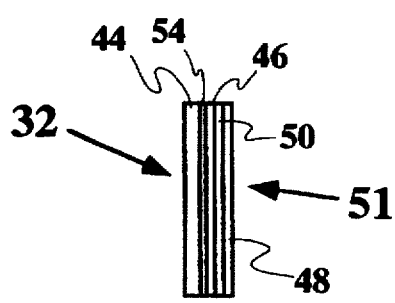
FIG. 4B is includes a side view of one embodiment of the magnetic piece illustrating the construction thereof.

As shown in FIG. 4A and 4B, the magnetic calendar 20 includes magnetic pieces 32 which are preferably constructed of a strip magnet 44 with a preferably paper sheet 50 which is laminated on front and back by a first transparent laminae 46 on one side and a second transparent laminae 48 on the other side of the paper sheet 50 which forms a laminated sheet 51. The laminated sheet 51 is then adhered to the strip magnet 44 by adhesive 54. Preferably, the magnetic strip 44 has adhesive 54 which is pressure sensitive on one side thereof. The ideal magnetic strip 44 is about 0.030 inch thick.

Figure 4C:
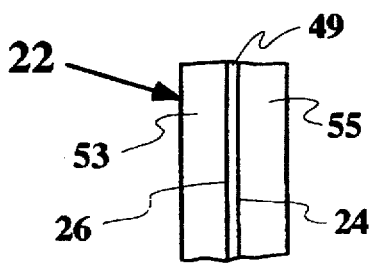
FIG. 4C is a partial sectioned side view of one embodiment of the body portion including transparent lamina on either side of a sheet structure.
Figure 4D:
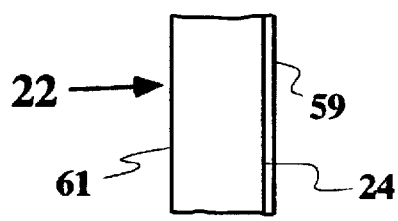
FIG. 4D is a partial sectioned side view of a cardboard embodiment of the body portion.

FIG. 4C illustrates a partial cross sectional portion of the body portion 22 showing the construction thereof. The body portion 22 is comprised of a back portion 53 and a front portion 55 with a sheet structure 49 sandwiched in between. Heat is applied to the front and back portion to cause the preferably plastic transparent laminae to adhere together around the edge of the sheet structure 49 and also to the front surface 24 and back surface 26 to resultantly form the body portion 22. FIG. 4D illustrates a body portion 22 constructed of cardboard or heavy paper 61 which may have a clear coating 59 formed thereon and has printing affixed to the front surface 24 thereof.

Figure 5:
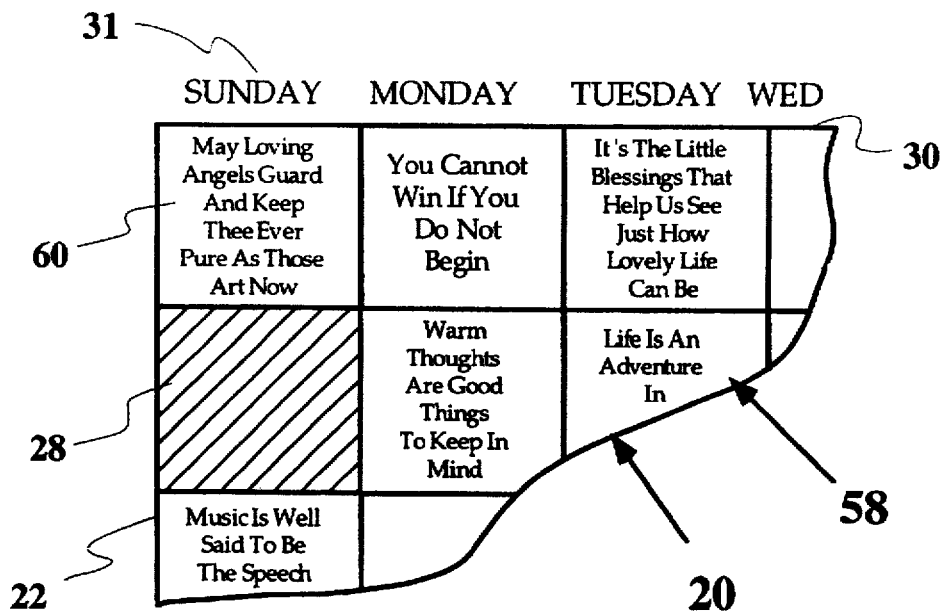
FIG. 5 is a partial frontal view of a portion of the grid section of the calendar illustrating a feature, such as a phrase, in each segment.
Figure 6:
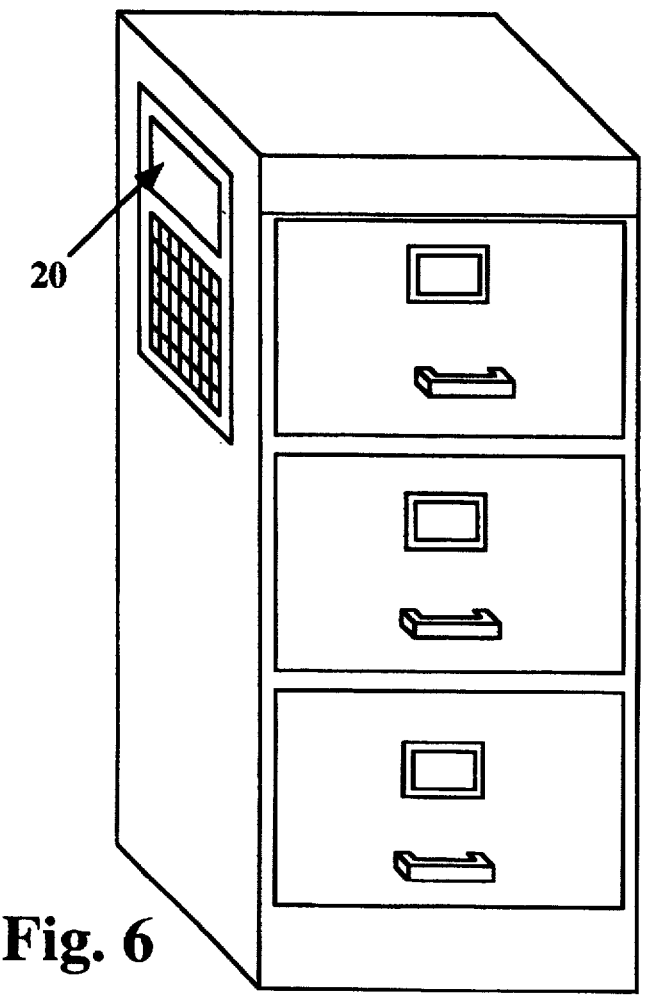
FIG. 6 is an isometric view of a filing cabinet with the magnetic calendar magnetically adhered to the side thereof.

FIG. 5 illustrates a portion of the body portion 22 of the magnetic calendar 20 illustrating artwork 58 printed or affixed to each segment 28 (shown hatched for clarity) within the grid-like section 30. In this embodiment the artwork 58 is a phrase 60 which is inspirational in nature and which may be used to teach morals, values, and ethics to children and adults alike. FIG. 6 shows the magnetic calendar 20 attached adjacent the metal surface 38 of a filing cabinet 62.

Figure 7:
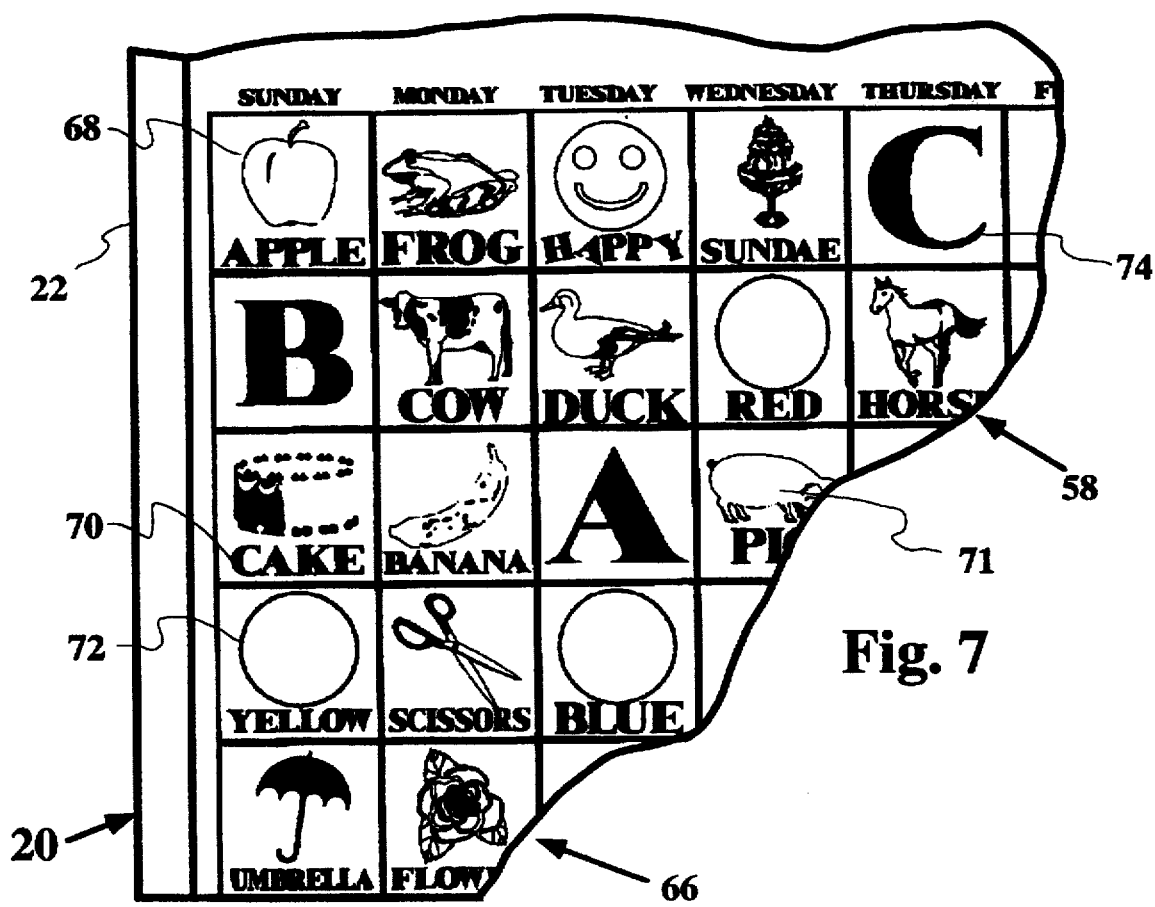
FIG. 7 is a partial frontal view of the grid portion including small pictorials printed in each segment.

FIG. 7 illustrates another embodiment of magnetic calendar 20 which includes artwork 58. In particular, the artwork 58 in this embodiment is comprised of small pictorials 66. For example, the artwork 58 may include in object 68 such as an apple, a happy face, scissors, an umbrella or the like; a word 70 such as cake, banana, cow, duck, frog or the like; an animal 71 such as pig, cow, horse, duck, frog or the like; a color 72 such yellow, red, blue or the like; and a letter 74 such as A, B, C or other letter of the alphabet. Again, these small pictorials 66 are useful for teaching children about such items.

Figure 8:
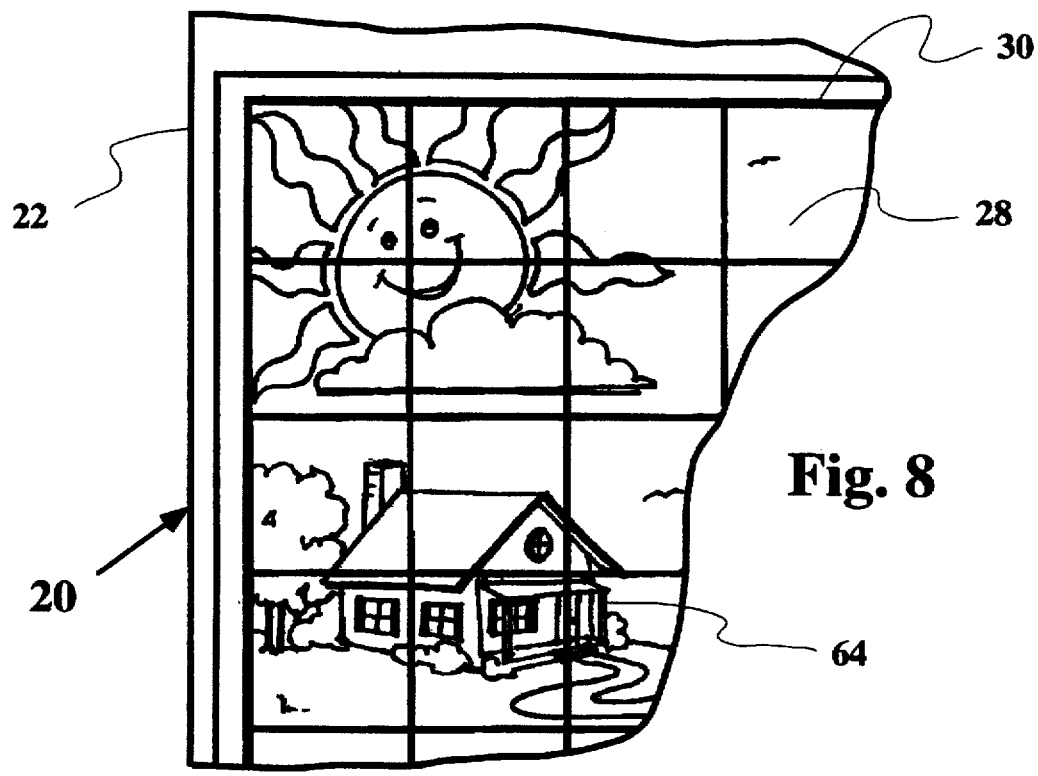
FIG. 8 is a partial frontal view of the grid portion including a large pictorial, a portion of which is in shown in each segment.

FIG. 8 is a frontal view of a portion of the body portion 22 of the magnetic calendar 20 illustrating a large pictorial 64 within the grid-like section 30 wherein each segment 28 subdivides the large pictorial 64.

FIG. 9 illustrates the back surface 26 of the body portion 22 of the magnetic calendar 20. Specifically it shows means for abutting 76 the metal surface 38 (not shown). In particular, the means for abutting 76 are two magnetic strips adhered to the back surface 26. The magnetic strips attach the body portion 22 to the metal surface 38 such as the refrigerator door or file cabinet and hold up the body portion when no magnetic pieces 32 are yet applied to the front surface 24 of the magnetic calendar 20. Further, the magnetic strips keep the top portion 77 of the body portion 22 from folding over or falling down when the other magnetic pieces 32 are adhered to the front surface 24 of the body portion 22.

FIG. 10 illustrates the magnetic calendar 20 housed within a frame 78. In this hanging-type embodiment, the substantially planar nonferromagnetic body portion 22 is housed in a frame 78 and a sheet of metal 79 which is ferromagnetic is also housed within the frame 78. The sheet of metal 79 abuts the substantially planar non-ferromagnetic portion 22 on the back surface 26 thereof. The sheet of metal 79 and body portion 22 are retained within the frame 78 by suitable means such as nails, tape, glue and the like. The frame 78 can be constructed out of plastic, wood or metal and includes a recessed portion having a lip formed thereon. When the body portion 22 is inserted into the recess, a portion of the front surface 24 comes into contact with the lip. In this way the body portion 22 is restrained within the frame 78 sandwiched around the edges between the frame 78 and the sheet of metal 79. The magnetic pieces 32 (not shown) will then adhere to the front surface 24 (not shown) of the body portion 22 due to the magnetic attractive force acting directly through said body portion 22 and to said metal surface 38 of the sheet of metal 79 housed in the frame 78. A suitable hanger 80 is attached to the frame 78 such as jagged member 82 shown. Jagged member 82 may be attached by nails 84 or the like.

In summary, the present invention is a magnetic calendar 20 which may be of the perpetual type, and which includes a non-ferromagnetic body portion 22 which is preferably rectangular and substantially planar, having a front surface 24 and back surface 26 for abutting a metal surface 38. The front surface 24 of the body portion 22 is divided into a plurality of segments 28 forming a grid-like section 30. The segments 28 may display artwork 58 such as a small pictorial 66, a portion of a large pictorial 64, or a phrase 60. The magnetic pieces 32 include a feature 33 such as indicia 36, an occasion 35, or a holiday 37 affixed thereon. The magnetic pieces 32 adhere to the front surface 24 of the non-ferromagnetic body portion 22 and preferably cover at least a portion of the artwork 58. The magnetic attractive force which adheres each magnetic piece 32 to the front surface 24 of the magnetic calendar 20 is formed between the magnetic strip 44 of each magnetic piece 32 and the metal surface 38 of the item to be attached to. The magnetic force acts through the body portion 22, which is preferably made of laminated construction.

From the foregoing, it should be apparent that the present invention now provides a novel magnetic calendar. While the preferred embodiment of the present invention has been described in detail, various modifications, alterations and changes may be made without departing from the spirit and scope of the present invention defined in the appended claims.

I claim:

1. A perpetual magnetic calendar to be used adjacent to a metal surface, comprising:
   (a) a slender non-ferromagnetic body portion of said magnetic calendar having a front surface and a back surface and being formed from a single sheet of color copied paper which is laminated with a transparent lamina, and said front surface of said slender non-ferromagnetic body portion having an upper bordered portion including a pictorial and a lower portion which is subdivided by vertical and horizontal printed lines into a plurality of segments forming a printed grid-like section,
   (b) a plurality of strip magnetic pieces each having an indicia feature affixed thereto, where said indicia feature is at least one selected from a group consisting of:
      i) a day of the month,
      i) an occasion, and
      i) a holiday, said plurality of magnetic pieces each constructed from a strip magnet upon which a laminated paper sheet segment is adhered, and said plurality of magnetic pieces are adapted for attachment to said front surface, each of said plurality of strip magnetic pieces producing a magnetic field and are placed adjacent to, and cover, several of said plurality of segments of said printed grid-like section, said magnetic field of said plurality of strip magnetic pieces causing a magnetic attractive force through said slender non-ferromagnetic body portion so as to adhere said plurality of strip magnetic pieces to said front surface and wherein said magnetic calendar is perpetual in that said plurality of strip magnetic pieces may be arranged in such a way that said magnetic calendar can be used for multiple months and years.

2. A perpetual magnetic calendar of claim 1 wherein several of said plurality of segments of said printed grid-like section display printed artwork, where said printed artwork is at least one selected from a group consisting of:
   i) a phrase,
   ii) a nonnumeric small pictorial for identification selected from a subgroup consisting of:
      I) a word,
      II) an object,
      III) an animal,
      IV) a color, and
      V) a single alphabetic letter,
      VI) a single object, and
   iii) a portion of a large nonnumeric pictorial.

3. A perpetual magnetic calendar of claim 2 further including at least one strip magnet adhered to said back surface of said slender non-ferromagnetic body portion for attaching said slender non-ferromagnetic body portion to the metal surface.

4. A perpetual magnetic calendar for abutting a substantially planar metal surface, comprising:
   (a) a slender laminated non-ferromagnetic body portion being constructed from a single paper sheet having a front surface and a back surface which are laminated with a transparent lamina forming a laminated front and a laminated back, said front surface having a portion which is subdivided by vertical and horizontal printed lines into a plurality of segments forming a printed grid-like section, several of said plurality of segments display a phrase,
   (b) a plurality of strip magnetic pieces having a feature affixed thereto for indicating at least one selected from a group consisting of:
      i) a day of the month,
      ii) an occasion, and
      iii) a holiday, said plurality of strip magnetic pieces producing a magnetic field and being placed on said plurality of segments so as to cover said phrase, said magnetic field of each of said plurality of strip magnetic pieces causing a magnetic attractive force through said slender laminated non-ferromagnetic body portion so as to adhere said plurality of strip magnetic pieces to said front surface of said slender laminated non-ferromagnetic body portion and wherein magnetic calendar is perpetual in that said plurality of strip magnetic pieces may be arranged in such a way on said printed grid-like section such that said perpetual magnetic calendar may be used for multiple months and years.

5. A perpetual magnetic calendar of claim 4 wherein said plurality of strip magnetic pieces are constructed from a paper sheet having a sheet front and a sheet back which is laminated on said sheet front and said sheet back with a transparent lamina forming a laminated paper sheet having a laminate front and laminate back, said laminated paper sheet having a strip magnet adhered by, pressure sensitive adhesive, to said laminate back of said laminated paper sheet.

6. A perpetual magnetic calendar of claim 4 wherein said slender laminated non-ferromagnetic body portion is constructed from a color copied paper sheet having a front and a back surface which is laminated on said front and back surface with a transparent lamina.

7. A perpetual magnetic calendar for attachment adjacent a metal surface, comprising:
   (a) a slender non-ferromagnetic body portion formed from a single sheet of color-copied paper having a front surface and a back surface which are laminated on said front surface and said back surface with a transparent lamina, said slender non-ferromagnetic body portion having a front surface and a back surface, said front surface having a portion which is subdivided by vertical and horizontal printed lines into a plurality of segments forming a printed grid-like section, at least one of said plurality of segments of said printed grid-like section displays a nonnumeric small pictorial for identification and aid in a child's learning selected from a group consisting of:

I) a word,
II) a food object,
III) an animal,
IV) a color, and
V) a single alphabetic letter, and (b) a plurality of magnetic strip pieces having a feature affixed thereon for indicating one selected from a group consisting of:

i) a day of the month,
ii) an occasion, and
iii) a holiday, said plurality of magnetic strip pieces producing a magnetic field and placed on said plurality of segments so as to cover said at least one of said plurality of segments containing said nonnumeric small pictorial said magnetic field of each of said plurality of magnetic pieces causing a magnetic attractive force through said slender non-ferromagnetic body portion so as to adhere said plurality of magnetic pieces to said front surface and wherein said magnetic calendar is perpetual in that said plurality of strip magnetic pieces may be arranged in such a way on said printed grid-like section such that said perpetual magnetic calendar may b e used for multiple months and years.

* * * * *